United States Patent Office 3,362,206
Patented Jan. 9, 1968

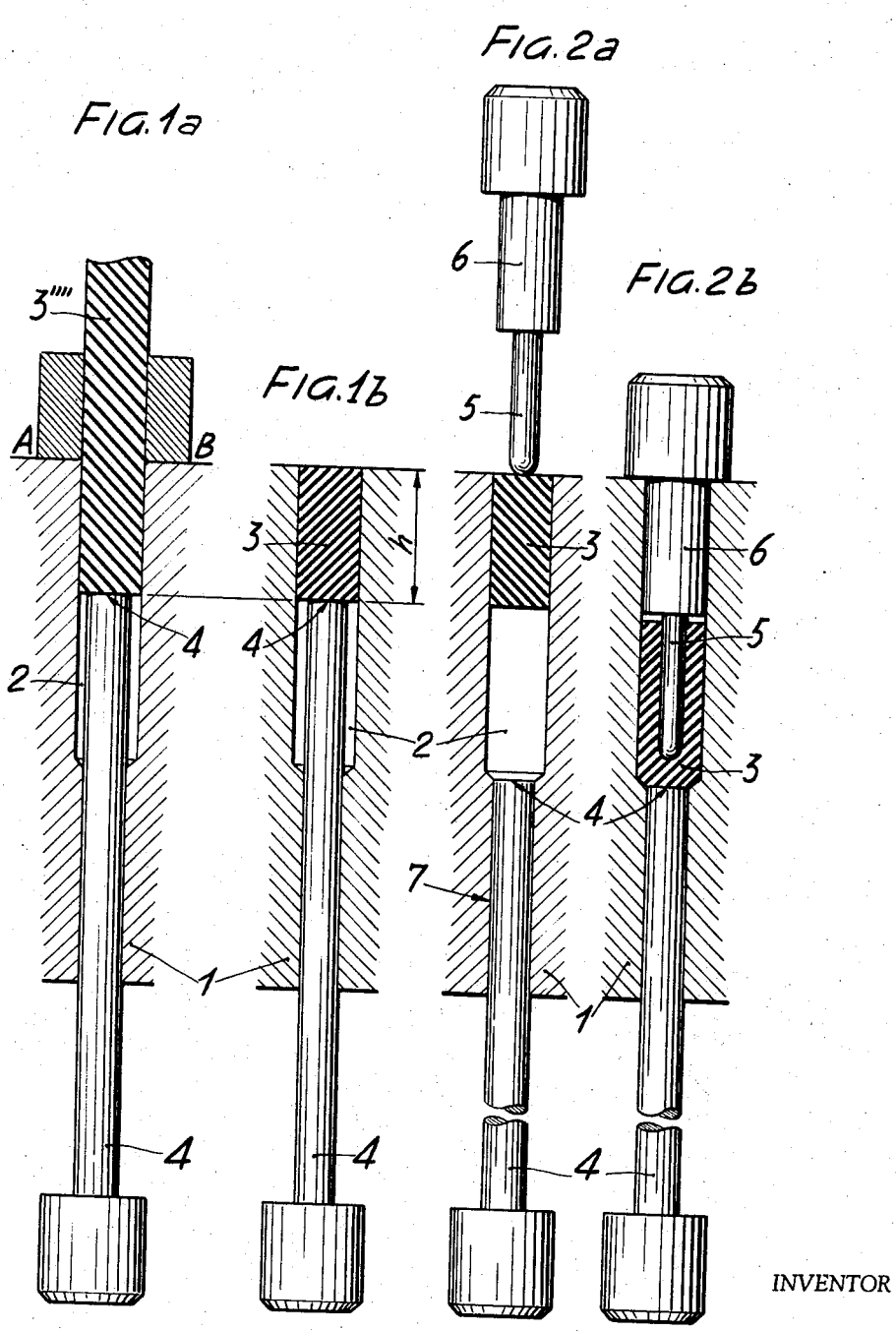

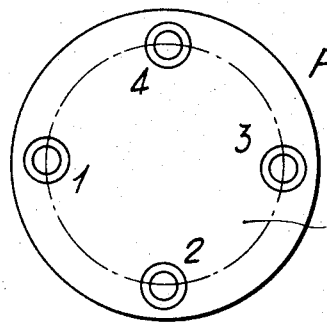
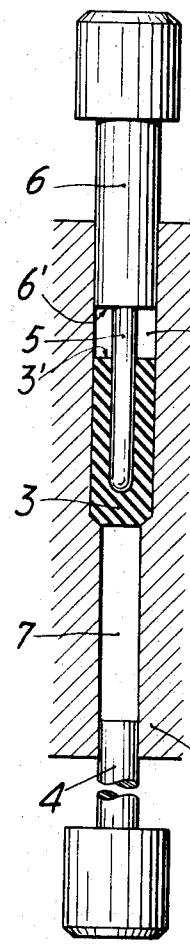
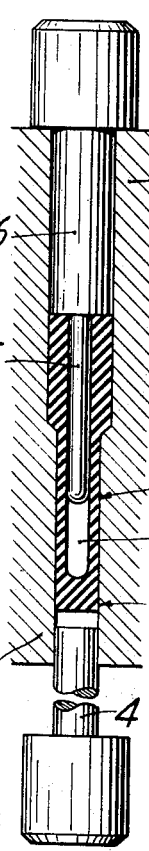
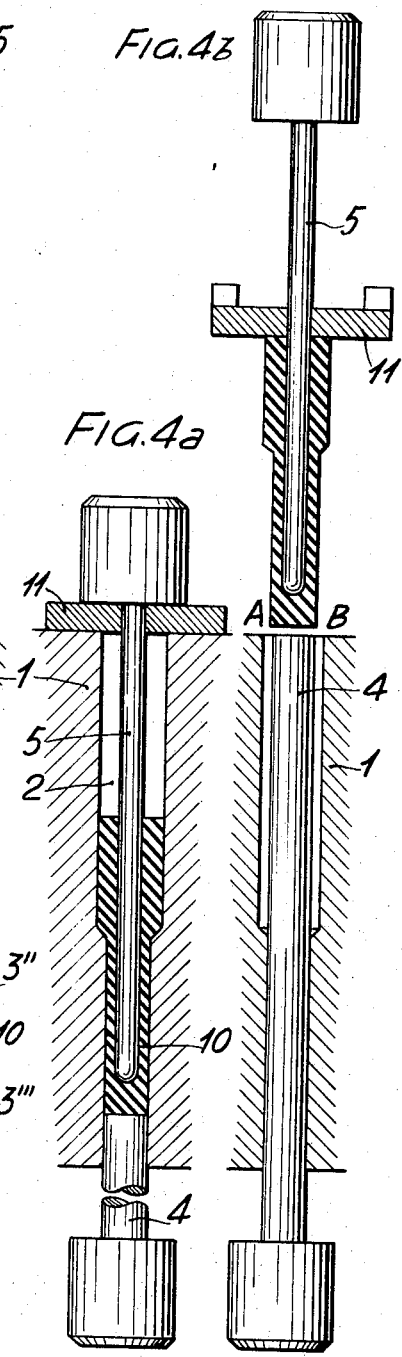

3,362,206
PROCESS FOR PRODUCING BALL PEN EXTRUDED TIPS
Guido Bertoglio, Lugano-Viganello, Switzerland, assignor to Real Patentauswertungs Anstalt, Vaduz, Liechtenstein
Filed May 24, 1965, Ser. No. 458,360
Claims priority, application Switzerland, May 26, 1964, 6,877/64
6 Claims. (Cl. 72—254)

ABSTRACT OF THE DISCLOSURE

Tips for ball-point pens are extruded in a female die having a portion of relatively large diameter and a portion of relatively small diameter. Wire is inserted part way in the large diameter portion and sheared off. It is then pressed to the bottom of the large diameter portion and back extruded, in opposition to a plunger. The plunger is then lowered and the blank is forward extruded with a male die, with a substantial length of blank remaining in the large diameter portion. The plunger and the male die are then moved together to strip the blank from the female die, after which the blank is stripped from the male die.

---

The present invention relates to a process for rapidly forming ball pen extruded tips, starting from a wire and without any waste of material.

Such a process is characterized by the fact that:

The wire end is introduced to a predetermined depth into a die having a succession of coaxial holes, the diameters of which decrease to less than the wire's diameter;

A cylinder is sheared from said end;

Said cylinder is extruded in subsequent working steps within said holes having decreasing diameters and for each step between an upper punch and a lower extractor which are coaxial to said holes and axially movable relative to them, the various lower extractors having a diameter equal to the diameter of the smallest die hole, the first station extractor acting as a stop for the wire end in order to determine the cylinder length to be cut;

The extrusion is carried out so that at an end of the extruded body a lower bottom is left to act as a ball seat.

The device for carrying out the process according to the present invention comprises a stepwise revolving platform or a stepwise moving platform having at least four dies, such dies being identical and corresponding to four stations, within each of which a work step is performed. In each of the stations an upper punch and a lower extractor are axially movable, said punches and extractors being, in the various stations, arranged above and below the platform so that they can penetrate into the die when the latter is coaxial with them.

The accompanying drawing diagrammatically shows a preferred but not restrictive embodiment of the device comprising the invention.

In the drawing:

FIGURES 1a–1b show two successive working steps within the die corresponding to the first station;

FIGURES 2a–2b show two successive working steps within the die corresponding to the second station;

FIGURES 3a–3b show two successive working steps carried out within the third station;

FIGURES 4a–4b show two successive working steps carried out within the fourth station; and FIGURE 5 is a very diagrammatic plan view showing the stepwise revolving platform carrying the four dies corresponding to the four aforementioned stations.

Referring to the drawing, the device includes the stepwise revolving platform 1′, capable of achieving four 90° steps in each full revolution.

In stations I–II–III–IV, each representing a stop position for platform 1′, four different operations, shown in FIGURES 1a–1b, 2a–2b, 3a–3b and 4a–4b, are accomplished.

To this purpose, four identical dies, sectionally illustrated in FIGURES 1a–1b, 2a–2b, 3a–3b and 4a–4b, are arranged in the platform. Each of the dies has a succession of holes of a decreasing diameter, and in the case shown merely two holes 2 and 7, the former corresponding to the diameter of cylinder 3 to be extruded, and the latter corresponding to the diameter of lower extractor 4.

In the first station (see FIGURE 1a), lower extractor 4 is brought up to a height corresponding to height $h$ of cylinder 3 which is desired to be cut from the superposed wire 3′′′′.

The wire end, forming part of wire 3′′′′, is then introduced into hole 2 (FIGURE 1a) to contact the upper end of extractor 4.

On passing from the first to the second station (FIGURE 1b) and taking advantage of the transverse movement (perpendicular to axis of cylinder 3) between revolving platform 1′ and stationary parts of the machine, cylinder 3 is sheared from the remaining portion 3′′′′ of the wire along the upper plane A–B of platform 1′.

In the second station (FIGURES 2a–2b), lower extractor 4 is depressed and brought with its top in correspondence with the separating surface between hole 2 and hole 7 (FIGURE 2a).

Punch 5, which is rounded at the lower part and integral with cylinder 6 and is controlled by a cam-tappet system, or the like (not shown), on being depressed causes cylinder 3 to be extruded, or causes material comprising it to re-ascend along the walls of hole 2 (FIGURE 2b) and this owing to the fact that lower extractor 4 prevents material from penetrating into lower hole 7.

In the third station (FIGURE 3a), extractor 4 is depressed so that most of hole 7 is left exposed, and punch 5, longer than the punch shown in FIGURE 2, urges hollow cylinder 3 so that when surface 6′ comes to press against surface 3′, material in the lower portion of cylinder 3 is caused to flow by extrusion into hole 7 below, producing walls 3′′ and bottom 3′′′ of the extruded body, as clearly shown in FIGURE 3b. The bottom portion 3′′′ is the portion that will make up the ball seat for the writing tip.

In position 4a, a punch 5 is introduced into hole 10 of the extruded body, such a punch being as long as the hole itself, so as to promote extraction of extruded body, which is made difficult by friction occurring between outer and inner walls of die 1, further imparting an accurate shape to the various portions of the extruded body.

On passing from step 4a to step 4b, extractor 4 is raised and simultaneously punch 5 is raised too. When extruded body 3 reaches the top, i.e. plane A–B of platform 1′, stop 11 retains the extruded body, while punch 5 emerges from inner hole 10 and extractor 4 is depressed to the position corresponding to FIGURE 1a.

Of course, the punches and extractors may be driven by cam-tappet systems, or by any other known and equivalent mechanism.

It is contemplated that the shape of the punches, the extractor and the holes may be notably different from the shape illustrated, that the stepwise revolving platform be replaced by a platform also provided with a stepwise reciprocating rectilinear movement, and that the number of holes of decreasing diameter may be even more than two, without departing from the patent protection limits.

I claim:

1. A process for producing ball pen extruded tips in a female die having at least a larger diameter portion and a smaller diameter portion, comprising inserting wire of about said larger diameter in said larger diameter portion to a depth substantially less than the length of the larger diameter portion, shearing off said inserted wire in the plane of the outer surface of the die, pushing the sheared-off wire into said die to the junction of said larger and smaller diameter portions, and extruding the sheared-off wire in said die to a shape having an axial recess therein.

2. A process as claimed in claim 1, in which said extrusion comprises back extruding the wire over a male die, limiting forward extrusion of the wire against a plunger of about said smaller diameter, withdrawing said plunger a substantial distance from said back-extruded wire, forwardly extruding said wire with at least one further male die, and stripping the back- and forward-extruded wire from said female die with said further male die in said axial recess and said plunger pushing the wire back in a direction opposite to the direction of insertion.

3. A process as claimed in claim 2, and subsequently stripping said back- and forward-extruded wire from said further male die.

4. A process for producing ball pen extruded tips in a female die having at least a larger diameter portion and a smaller diameter portion, comprising inserting in said larger diameter portion a blank of a length less than the length of said larger diameter portion and of a diameter about that of said larger diameter portion to the junction of said larger and smaller diameter portions, back extruding said blank with a first male die while opposing the blank with a plunger disposed in and of about the diameter of said smaller diameter portion, withdrawing said plunger a substantial distance from said back-extruded blank, forward extruding said blank toward said plunger with at least one further male die, and stripping said back- and forward-extruded blank from said female die with a male die substantially completely filling the cavity in the blank by pressing against said back- and forward-extruded blank with said plunger.

5. A process as claimed in claim 4, and subsequently stripping said blank from the last-named male die.

6. A process for producing ball pen extruded tips in a female die having at least a larger diameter portion and a smaller diameter portion, comprising inserting in the larger diameter portion a blank of a length substantially less than the length of the larger diameter portion, back extruding said blank with a first male die while limiting forward extrusion of said blank with a plunger of a diameter about that of and disposed in said smaller diameter portion, and then forward extruding said blank into said smaller diameter portion with a further male die while preserving a substantial portion of the blank in said larger diameter portion so that said substantial portion of the blank in said larger diameter portion has a cylindrical outer contour of substantial length parallel to the axis of the female die, and stripping from said female die a blank with said substantial quantity of larger diameter.

References Cited

UNITED STATES PATENTS

| | | | |
|---|---|---|---|
| 682,360 | 9/1901 | Keithley | 72—266 |
| 2,736,085 | 2/1956 | Parre | 72—266 X |
| 2,969,030 | 1/1961 | Kahn | 113—32 |
| 3,054,177 | 9/1962 | Duhamel | 72—254 |
| 3,101,534 | 8/1963 | Lange | 72—254 |

CHARLES W. LANHAM, *Primary Examiner.*

K. C. DECKER, *Assistant Examiner.*